United States Patent
Nir et al.

(10) Patent No.: US 8,131,752 B2
(45) Date of Patent: Mar. 6, 2012

(54) BREAKING DOCUMENTS

(75) Inventors: Ehud Nir, San Mateo, CA (US); Amir Ashkenazi, Los Altos, CA (US)

(73) Assignee: eBay Inc., San Jose, CA (US)

( * ) Notice: Subject to any disclaimer, the term of this patent is extended or adjusted under 35 U.S.C. 154(b) by 600 days.

(21) Appl. No.: 11/599,749

(22) Filed: Nov. 15, 2006

(65) Prior Publication Data

US 2008/0114786 A1    May 15, 2008

(51) Int. Cl.
*G06F 17/30* (2006.01)
(52) U.S. Cl. .................. 707/770; 707/E17.118
(58) Field of Classification Search .......... None
See application file for complete search history.

(56) References Cited

U.S. PATENT DOCUMENTS

| | | | |
|---|---|---|---|
| 6,442,296 B1 * | 8/2002 | Smith et al. | 382/237 |
| 2004/0208371 A1 * | 10/2004 | Liu et al. | 382/173 |
| 2005/0125429 A1 * | 6/2005 | Corston-Oliver et al. | 707/100 |
| 2005/0154703 A1 * | 7/2005 | Ikada | 707/1 |
| 2005/0198046 A1 * | 9/2005 | McAuley | 707/100 |
| 2006/0047637 A1 * | 3/2006 | Meyerzon et al. | 707/3 |
| 2008/0040359 A1 * | 2/2008 | Arrouye et al. | 707/100 |
| 2008/0063278 A1 * | 3/2008 | Vincent et al. | 382/182 |

* cited by examiner

*Primary Examiner* — Jean B Fleurantin
*Assistant Examiner* — Anteneh Girma
(74) *Attorney, Agent, or Firm* — Schwegman, Lundberg & Woessner, P.A.

(57) ABSTRACT

A system receives a document including a plurality of items. The system then breaks the document into a plurality of subdocuments corresponding to the plurality of items and indexes the plurality of subdocuments.

21 Claims, 6 Drawing Sheets

BREAKING DOCUMENTS

TECHNICAL FIELD

This application relates to processing, according to one embodiment, a document into subdocuments.

BACKGROUND

Often a webmaster (e.g., author of a website) has to make an editorial decision to determine what will be on a single page versus what will be distributed on multiple pages. In the interest convenience to a viewer of a page the webmaster will create the page to include multiple items. A good example of that are FAQ (frequently asked question) pages, where many FAQ pages are just one single page with hundreds of questions. A search engine would then catalogue or index the entire page for each individual FAQ. As a result, when a user of the search engine submits a request matching one of the FAQs the search engine returns the entire page including the non-relevant FAQs and the user has to scan the entire page to find the relevant FAQ.

BRIEF DESCRIPTION OF THE DRAWINGS

The present invention is illustrated by way of example, and not by way of limitation, in the figures of the accompanying drawings in which.

DETAILED DESCRIPTION

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

As used herein, "document" is defined as a data file that may include one or more sets of electronic data (data), including data stored on a portable tangible medium (e.g., compact disc (CD), flash drive, etc.) and/or data received over a network (e.g., the Internet). The electronic data may include, but is not limited to, data types such as encrypted and non-encrypted text files, audio/visual files (e.g., music, video, and speech), network links (e.g., URL—uniform resource locator), etc. The electronic data of a document may further be sectioned or grouped into "item data." For example, a document may have three sections corresponding to "items" and associated item data. The items, for example, may be a product listing, a review, and a frequently asked question (FAQ), each item including its associated item data, such as product description and image, price, question, review text, etc. Each section of item data may include some or all the data types discussed above with reference to the electronic data.

A "subdocument" is a subset of a document that has been extracted or broken out of a document and includes item data corresponding to an item located in the document. A subdocument may be extracted for each item and associated item data in the document. Additionally, a document and subdocument may include appended metadata. "Metadata" is information that is not included in the original document and may be used to "tag" the document with "document context" data. Document context data is relevant data that may be appended to the document to facilitate operations on the document, such as indexing and searching. For example, metadata may be added as a "document context" data to a subdocument to distinguish its content from the content of another subdocument in a key word search.

A "data store" is a data repository (e.g., a data server) that contains the original documents and extracted subdocuments. An "index" is a data structure that identifies documents (subdocuments) in the data store that are associated with specific data of the document. For example, a search engine may process every word of three documents and add those words to an index. Each word indexed is associated with at least one of the processed documents and in some cases all three documents. After which, if a search for a particular word or words is made the system refers to the index and retrieves each document (subdocument) from the data store associated with the word or words (search term(s)). The indexing is not limited to text or words but may be applied to any data (e.g., images, metadata, etc.) that may be processed into an index data structure. "Relevancy" is a term to describe the results of a search utilizing a ranking algorithm to sort a search of the index. Various ranking algorithms may be applied to attempt provide a user with the most relevant documents (subdocuments) based on the search request (query).

In one embodiment, a document including a plurality of items is received and then broken into a plurality of subdocuments. Each subdocument corresponds to a unique one of the plurality of items. Each subdocument is indexed to provide the most relevant subdocuments in response to a search request.

Figure 1:
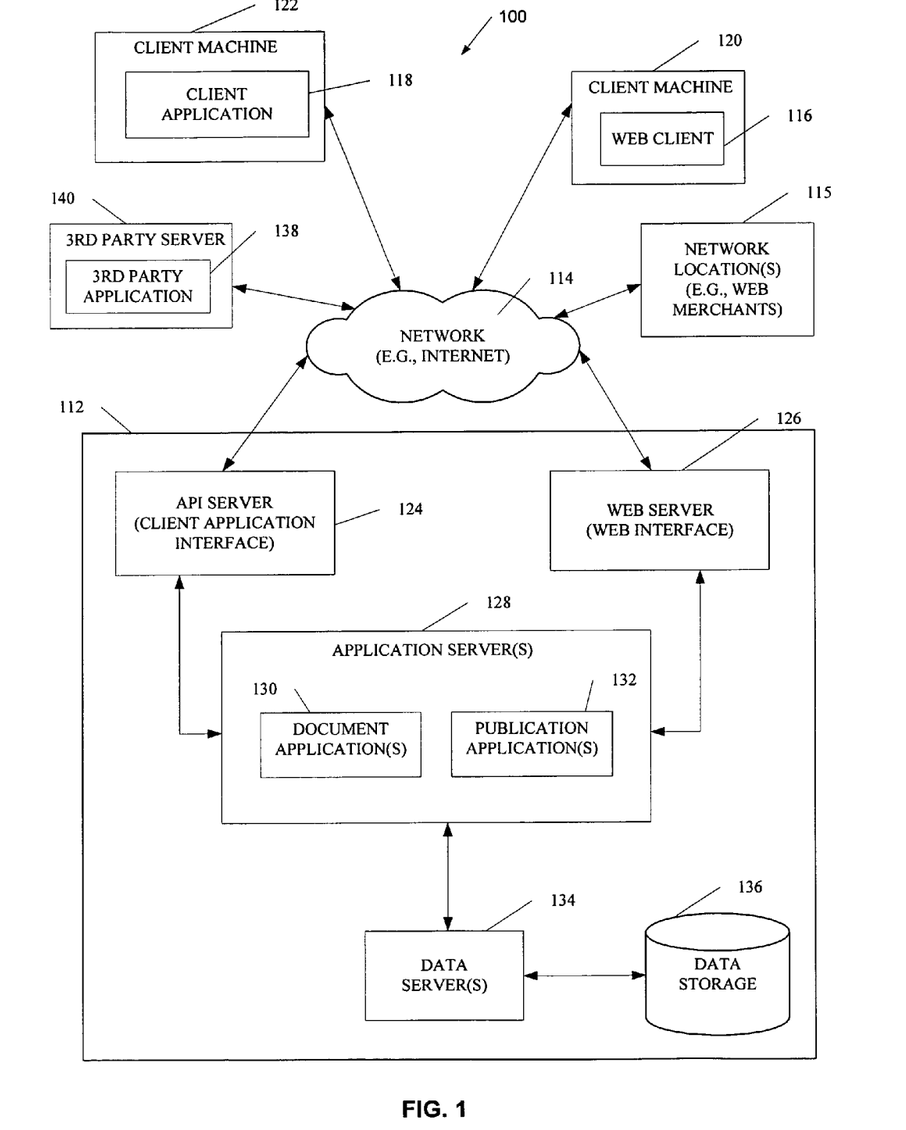
FIG. 1 is a network diagram depicting a network system, according to one embodiment, having a client-server architecture configured for exchanging data over a network.

FIG. 1 is a network diagram depicting an example embodiment of a network system 100 having a client-server architecture configured for exchanging and processing data in a network environment. For example, the network system 100 may be a publication system where clients may communicate, view, and search various types of data. The data may pertain to various functions and aspects (e.g., online item searches, merchant affiliations, etc.) associated with the network system 100.

A data exchange platform, in an example form of a network-based provider 112, provides server-side functionality, via a network 114 (e.g., the Internet) to one or more clients. The one or more clients may include users that may utilize the network system 100 and more specifically, the network-based provider 112, to exchange data over the network 114. User transactions may include receiving and processing item data from a multitude of users, such as review data, search request data, feedback data, etc.

Additionally, the network-based provider 112 may include data collection functionality to retrieve data from a plurality of sources, such as network location(s) 115 (e.g., merchants sites, etc.). The data may include, but is not limited to, item related data, such as item listings (products and services), item reviews, item categories, links associated with items, feedback, etc. In one embodiment, a user initiates a search via a request for an item or item related data and the network-based provider 112 returns a list of most relevant items and associated supporting data (e.g., price, merchant, etc.). The network-based provider 112 may, for example, obtain at least a portion of the item data by searching locations over the network 114 (e.g., a web crawler on the Internet) for documents containing one or more instances of relevant item data and breaking that document into multiple subdocuments corresponding to each item and corresponding item data. The subdocuments may then be indexed into a system such as the network system 100. In another embodiment, the network-based provider 112 receives a document through other means known in the art, such as by transmission or digital media including but not limited to hard drives, floppy disks, memory sticks and the like.

In one embodiment, a user initiates a search via a search request communicated to the network-based provider 112. In response, the network-based provider 112 returns a list of most relevant items including associated item data (e.g., price, merchant, FAQ data, etc.). Specifically, the network-based provider 112 utilizes application servers 128 and data server(s) 134 to search an index to retrieve the most relevant documents and subdocuments including item data from a data store. In one embodiment, the index and the data store are located on data storage 136. However, it can be appreciated the index and data store may be located remotely or locally on one or more storage mediums.

In one embodiment, the network-based provider 112 may obtain documents and subdocuments of item data by searching network location(s) 115. For example, the search may be done utilizing a web crawler searching over the Internet. A document containing multiple instances of item data may then be retrieved and broken into one or more subdocuments corresponding to each instance of item data (e.g., FAQ, review, product). The multiple subdocuments may then be indexed and stored in the data storage 136.

Optionally, prior to storing the subdocuments, the subdocuments may be appended with data, such as metadata, which may be included in the index and associated with the subdocuments. In various embodiments, the metadata may be derived from specific data of the item data or other data pertaining to the document. It can be appreciated the network-based provider 112 may receive the document through other means known in the art, such as by transmission or digital media including, but not limited to, hard drives, floppy disks, memory sticks and the like.

An application program interface (API) server 124 and a web server 126 provide programmatic and web interfaces to one or more application servers 128. The application servers 128 may host one or more other applications, such as document applications 130 and publication applications 132. The application servers 128 are may be coupled to one or more data servers 134 that facilitate access to one or more storage devices, such as the data storage 136.

The publication applications 132 may include various modules to provide a number of publication functions and services to users that access the network-based provider 112. For example, these services may include, inter alia, formatting and delivering search results to a client. The document applications 130 likewise may provide a number of document processing modules to facilitate processing retrieved documents and their associated item data into subdocuments. For example, the modules functions may include, inter alia, web crawling, indexing, breaking a document into subdocument(s), storing, searching, etc.

FIG. 1 also illustrates a third party application 138, which may operate on a third party server 140 and have programmatic access to the network-based provider 112 via the programmatic interface provided by the API server 124. For example, the third party application 138 may utilize various types of data retrieved from the network-based provider 112 and support one or more features or functions normally performed at the network-based provider 112. For example, the third party application 138 may receive a copy of all or a portion of the data storage 136 that includes the index and the data store. Consequently, the third party server 140 may then provide a response to a search query in a similar fashion to the network-based provider 112 as discussed above. Additionally, in another embodiment, similar to the network-based provider 112, the third party application 138 may also include modules to perform operations pertaining to web crawling, indexing, breaking a document into subdocument(s), storing, searching, etc. In yet another embodiment, the third party server 140 may collaborate with the network-based provider 112 by sharing retrieved document data, such as whole documents, created subdocuments, index data, etc.

Figure 2:
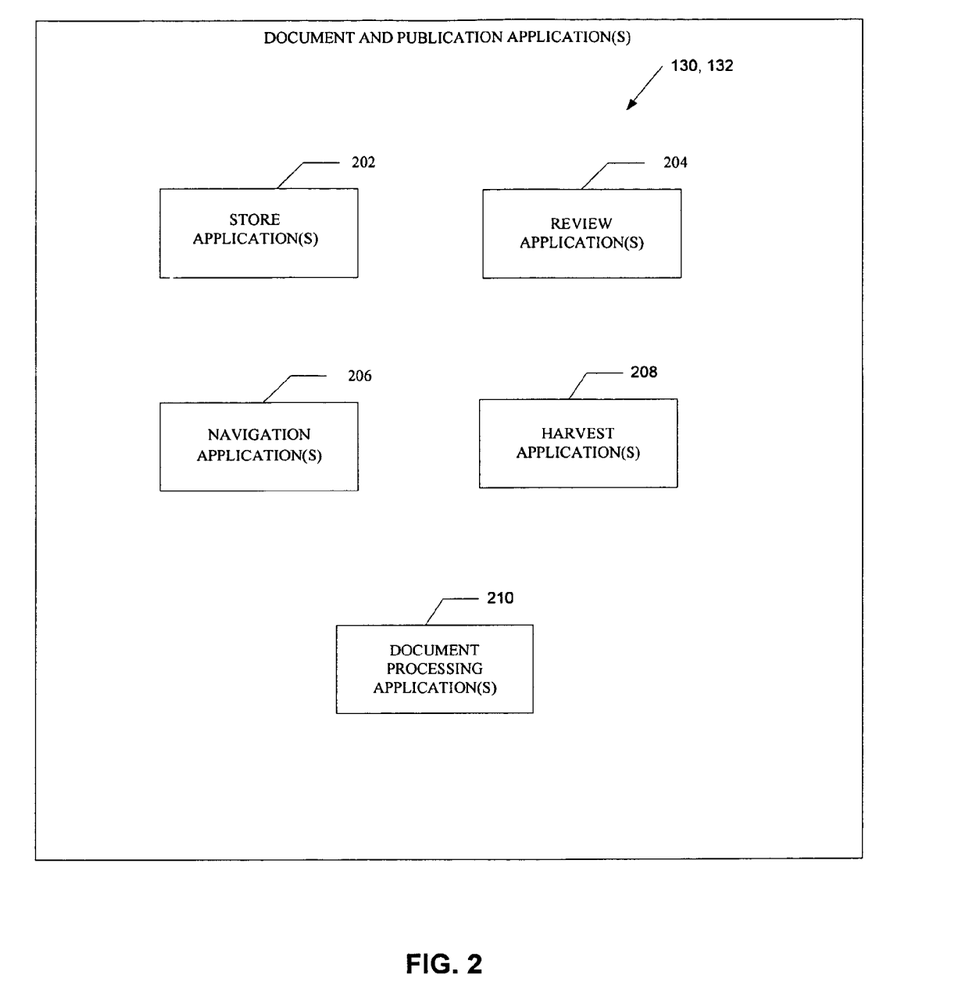
FIG. 2 is a block diagram illustrating an example embodiment of multiple document and publication applications, which are provided as part of a network-based provider.

FIG. 2 is a block diagram illustrating an example embodiment of multiple document and publication applications 130 and 132, respectively, which are provided as part of the network-based provider 112. The network-based provider 112 may provide a number of searching, document-processing, shopping, and listing mechanisms. For example, a user may search, view, compare and select via a user interface various items from a list of items and/or related item data associated with one or more indexed subdocuments. The selection of an item may include a multitude of responses from the network-based provider 112. For example, a user selection (e.g., via a selectable link) from an item list of relevant subdocuments created from a search of the index may result in the entire selected subdocument being returned from the data store and displayed to the user. In another embodiment, all the relevant subdocuments are returned to the user's machine (e.g., client machine 122) and the user selects from a locally generated item list.

To this end, the document and publication applications 130 and 132, respectively, are shown to include one or more applications which support the network-based provider 112, and more specifically the obtaining and breaking documents into multiple subdocuments to be indexed and stored in a data store (e.g., data storage 136). In various embodiments, the index and the subdocuments may be maintained stored in searchable mediums, such as a central data storage device (e.g., data storage 136), local machine (e.g., client machine 120, 122), or stored in a distributed fashion among various peer machines (e.g., in a peer to peer network).

In one embodiment, store applications 202 allows for sellers to provide their documents and associated item data (e.g., FAQs, product and service reviews, etc.) to the network-based provider 112. The item data may be branded and otherwise personalized by and for the sellers (or manufacturers) and include, inter alia, links to specific products, reviews, FAQs, and images. In one embodiment, a seller may provide access (e.g., login credentials) to the network-based provider 112 to their network location (e.g., website) to retrieve documents to break, index and store. In another embodiment, item data (text, images, metadata, etc.) may be provided by a document source (e.g., merchant or manufacturer) to supplement documents previously retrieved from the network (e.g., Internet) or other location (e.g., computer disk). For example, an item of brand X retrieved from a source (e.g., web page) may be displayed to a requesting user with supplemented data provided by the source (e.g., logo, links, etc.). In one embodiment, the source may pay a fee to the network-based provider 112 to add the supplementary data.

In one embodiment, the network-based provider 112 includes review applications 204. The review applications 204 may be operated by a third party system accessible by the network-based provider 112. The review applications 204 may provide review and/or recommendation data submitted by a user that may be associated with specific indexed subdocuments. Each review is processed as a subdocument, indexed and stored. A review subdocument may include appended metadata that will be indexed such that its document context may be associated with the subdocument being reviewed by the user. For example, a user review a specific model of electronic device may be processed as a subdocument, automatically matched to the document context of the subdocument of the model being reviewed, appended with metadata, indexed, and stored. If a subsequent search for the specific model is made the subdocument of the user's review will be retrieved along with other relevant subdocuments.

In one embodiment, the review applications 204 may provide a user interface to facilitate the entry of reviews of the items displayed on a list generated by a user request. For example, a user may type in "digital cameras" as a request and have an option to submit a review on one or more models in the list. A review may include one or more of a text entry, a standard review form including check boxes indicating a level satisfaction, etc. The reviews may include a document context associated with the reviewed subject matter and are indexed and stored as subdocuments.

Navigation of the network-based provider 112 may be facilitated by one or more navigation applications 206 and associated modules. For example, navigation applications 206 may provide a user with a user interface (UI) for keyword or context queries (searches) of the indexed subdocuments, including products, services, reviews, frequently asked questions (FAQs), etc. In one embodiment, the search request data (e.g., keyword(s), image data, etc.) is matched to a document context (e.g., metadata, title, etc.) associated with the indexed and stored subdocuments.

The navigation applications 206 may also provide a user interface (UI) to browse search results by category, date, etc. In one embodiment, this includes the creation of a subdocument listing associated with a search (via query or request). The listing may be based on a matching the search with one or more document contexts used by the system to locate relevant subdocuments in the index. In various embodiments, document contexts associated with a subdocument may be any one of combination of manufacturer, provider, model, technical details of the item, item rating (e.g., star rating), review titles, etc. The UI associated with the subdocument listing may include various functional controls and links. For example, it may include a link to advertisers or merchants associated with one or more document contexts associated with the retrieved subdocument. In one embodiment, a sponsor may pay to have their link(s) displayed on the UI.

Searching and retrieving documents from one or more networks, such as the Internet, may be facilitated by the network-based provider 112 using one or more harvest application(s) 208. In one embodiment, the harvest application(s) 208 systematically retrieves documents (e.g., web documents) from a multitude of network sites (e.g., merchant site) and/or other storage locations. A module may be programmatically configured to periodically retrieve documents from a preconfigured list of sources (e.g., merchants, reviewers, etc.) or generate destination URLs (uniform resource locator) based on one or more crawling algorithms.

Breaking and indexing retrieved documents may be facilitated by the network-based provider 112 using one or more document processing application(s) 210. The document processing application(s) 210 may include one or more modules that process a single document containing multiple items (e.g., product, review, FAQ, etc.) into corresponding multiple subdocuments. The document may be in structured to include sections corresponding to each item. The sections may include break points within the document structure that serve as a boundary between each item in the document. Based on those break points/boundaries, the document may be broken into subdocuments for each item. The breaking operation may include one or more algorithms to determine which portions of the document correspond to separate items. For example, the document processing application(s) 210 may determine which portions of the document are associated with an item (e.g., product, service, review, FAQ, etc.) and which portions are associated with non-item related data (e.g., site index link, etc.). The item may be broken out into subdocuments while the non-item data may be ignored.

The document processing application(s) 210 may include one or more modules to break a retrieved or received document into subdocuments, add one or more document contexts (e.g., metadata), and index and store the subdocuments. As mentioned above, the document context may be associated with a particular item. The document context may be derived based on analyzing the item data of the subdocument and/or data of the original document. For example, the title of a document may be "Reviews for a 5 megapixel Canon® camera," and include 3 reviews. The three reviews are broken out into subdocuments and a document context of "5 megapixel Canon® camera" may be appended as metadata to each subdocument. In another embodiment, additional metadata may be appended to provide additional scope for indexing. For example, "camera," "digital camera," and "5 megapixel," may be appended to each subdocument as metadata. The subdocuments including the metadata may be indexed and retrieved from a data store based a search query applied to the index.

It will be appreciated that one or more of the various example document and publication applications 130, 132 may be combined into a single application. Further, in some embodiments, one or more applications may be omitted and additional applications may be included and some or all of the functionalities of document and publication applications 130, 132 may be implemented in one or more applications operating on the network-based provider 112, a client machine (e.g., client machine 122), or across multiple networked clients, such as clients operating in a peer to peer configuration.

Figure 3:
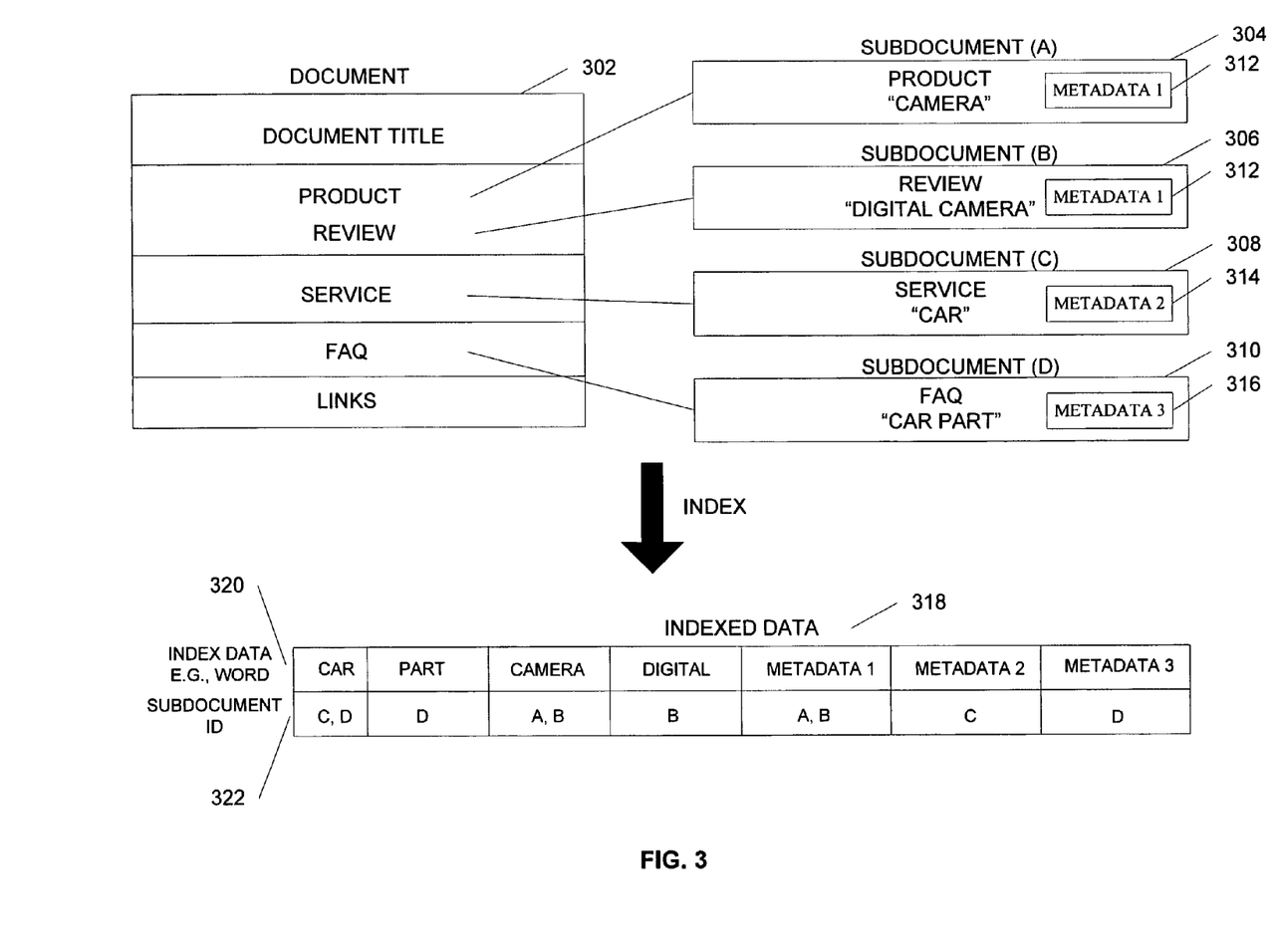
FIG. 3 illustrates an example of a retrieved document including various document elements, such as the document title and links, and various items, which may be sorted and broken down into individual documents for storage (e.g., indexed database) and subsequent retrieval.

FIG. 3 illustrates an example of a retrieved/received document 302 including various document elements, such as the document title and links, and various items in sections including product, review, service, and FAQ, all of which may be sorted and broken down into subdocuments for indexing and storing. Although all the items are shown in a single document 302, it can be appreciated each item may have been received in individual documents and processed in a similarly to the document 302 as discussed below.

The document 302 may be analyzed and broken down into subdocuments 304, 306, 308, and 310—subdocuments A, B, C, and D, respectively. Each subdocument corresponding to the product, the review, the service, and the FAQ. As previously discussed, once the subdocuments have been broken out from the document(s) they may be analyzed to determine a document context to append to the subdocument prior to indexing. In the example subdocuments of FIG. 3, subdocuments 304 and 306 include metadata(1) 312, subdocument 308 metadata(2) 314, and subdocument 310 metadata(3) 316. Additionally, subdocuments 304, 306, 308 and 310 include text based data, the words "camera," "digital camera," "car," and "car part," respectively. These are select few words illustrated only for example. A complete subdocument may have various amounts of data (e.g., many words) in addition to various other types of data (e.g., graphical, etc.) as discussed above.

In one embodiment, indexing operations process each subdocument into an index as illustrated in indexed data 318. Indexed data 318 includes a row of indexed data 320 and a row of subdocument IDs (identifiers) 322. The index data 320, in this example, is a word that is commonly found in each subdocument. Each column of the indexed data is a mapping between a specific piece of index data 320 (e.g., a word) to a subdocument ID that may be used to retrieve the identified subdocuments from the data store. For example, a search request for "camera" would result subdocument 304 (A) and subdocument 306 (B) being returned from the data store to the user. As mentioned above, FIG. 3 illustrates a simple example and it can be appreciated similar operations may be executed for a multitude of documents and subdocuments across many data types and index data 320 may include one or more words, such as a phrase.

As illustrated the document 302 appears laid out as "sections" as displayed on a user interface, however, the underlying code may not be structured in a manner consistent with each section. For example, the code may be a markup language (e.g., hypertext markup language-HTML) including executable portions, tables, strings, etc., which may not logically correspond to the document as displayed. Consequently, various algorithms may be used to process the code to locate logical breaks or sections in the document corresponding to items to be broken out into subdocuments.

Figure 4A:
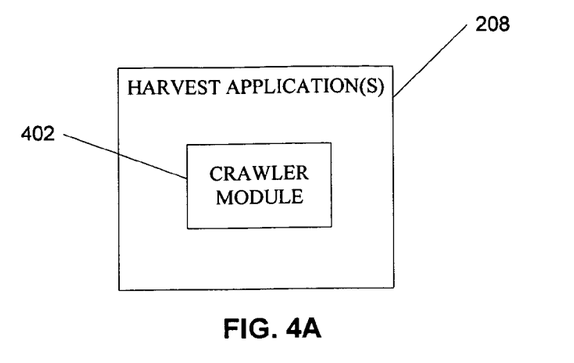
FIGS. 4A, 4B, and 4C illustrate example embodiments of specific applications and their modules to process documents received at a network system.
Figure 4B:
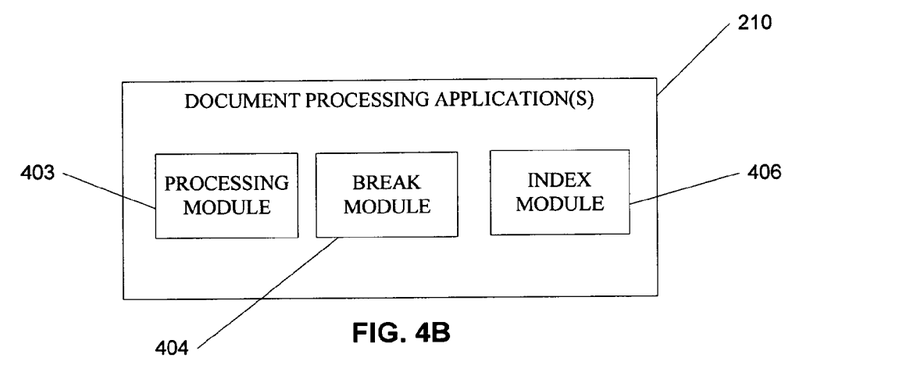
Figure 4C:
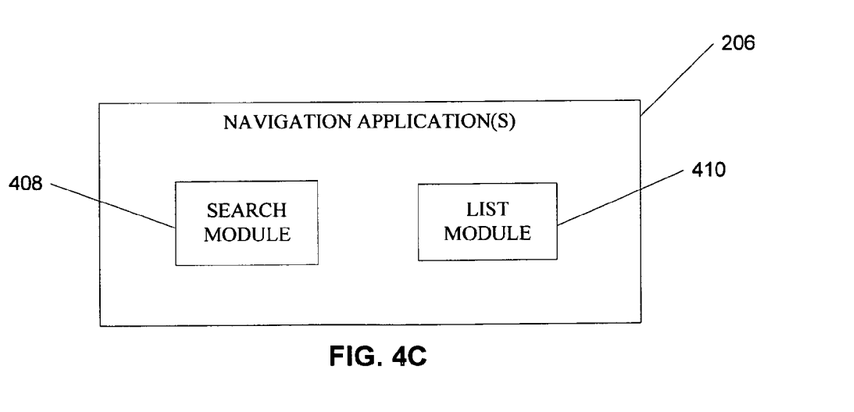

FIGS. 4A, 4B, and 4C illustrate example embodiments of specific applications and their modules to locate and retrieve documents on a network, break the documents into two or more subdocuments, index the subdocuments, respond to a user search query and generate a listing to display to the user.

In one embodiment, harvest application(s) 208 in FIG. 4A includes a crawler module 402 configured to search a network (e.g., the Internet) for documents (e.g., web documents) to retrieve, break, index, and store. The crawler module 402, for example, may be configured to search specific document source locations based on various search parameters, such as domain name or specific network address (e.g., URL). In various embodiments, the crawler module 402 may be configured to randomly select source locations (e.g., domains) and search based on a preconfigured list of sources (e.g., domains—merchant.com). The crawler module may then acquire documents from the sources respective subdirectory structures or search only those locations on a preconfigured list. In another embodiment, the harvest applications 208 may receive documents from a document storage device operated by the network-based provider 112 or a third party crawling and storage system.

The document processing application(s) 210 in FIG. 4B includes a processing module 403, a break module 404 and an index module 406. The processing module 403 receives new documents that may be retrieved or received from various sources, such as from the harvest application(s) 208, internal and external (to the network system 100) digital media, and internal or external networks. The break module 404 may use various algorithms to process a document retrieved from the network (e.g., via a web crawler) to create one or more subdocuments. The break module may create a title section that includes document context data (e.g., metadata and/or item data). However, it can be appreciated the document context data may be located in any part of the document, such as the body or the file name.

In various embodiments, there may be a multitude of algorithms used to break the document into subdocuments. These algorithms include, but are not limited to various data parsing algorithms, such as text segmentation and HTML format analysis. In one embodiment, text segmentation includes such operations as identifying ends of sentences, full stops, font analysis, grammatical analysis, etc. HTML format analysis may include operations to identify geographical regions of the document in order to identify items to be broken into subdocuments in addition to analyzing format identifiers, such as fonts, specific sections, etc.

The index module 406 may then process the subdocuments into an index as illustrated and described above with respect to FIG. 3. As described above, the subdocuments may be indexed according to their original content (e.g., original text) and by document context data such as appended metadata.

In one embodiment, the index module 406 may automatically search the original document and each subdocument to locate document context data. For example, a document title or header may include descriptive information regarding the general contents of the entire document. For example, the title may be a specific model of digital camera and the document may include a product description section, review section, and FAQ section. Each section gets broken out as a subdocument and the index module 406 appends the specific model information as metadata to each subdocument. A subsequent search for the specific model results in a return of at least those three subdocuments. In one embodiment, the title data, and specifically the words, may be compared to keywords such as previously identified and stored words. For example, a list of all known digital cameras may be stored in a database and compared to words of the document and subdocuments to locate relevant document context data to append to the subdocuments. New keywords may be entered into the database or discovered in the searching and breaking of documents.

In one embodiment, the navigation application(s) 206 in FIG. 4C includes a search module 408 and a list module 410. The search module 408, according to one embodiment, may provide a user interface to a user of a client machine (e.g., client machine 120, 122) that allows a user to enter a search request or query. A search request may be generated from text input by the user, a selectable link on the interface (e.g., "digital cameras"), or by other means for communicating a request for data to the network-based provider 112. For example, a user may enter the text, "portable music player" and receive from the network-based provider 112 (or remote storage source(s)) a list of available relevant subdocuments generated by the list module 410. Additionally, the search module 408 and list module 410 may work in conjunction to provide the user with selectable options within the use interface based on a search query. For example a search query may be general, such as "digital cameras." The response from the search module 408 and list module 410 may be to return and display a list of selectable options, such as an option to view the all or a portion (e.g., title only) of the subdocuments or to further narrow the search.

Figure 5:
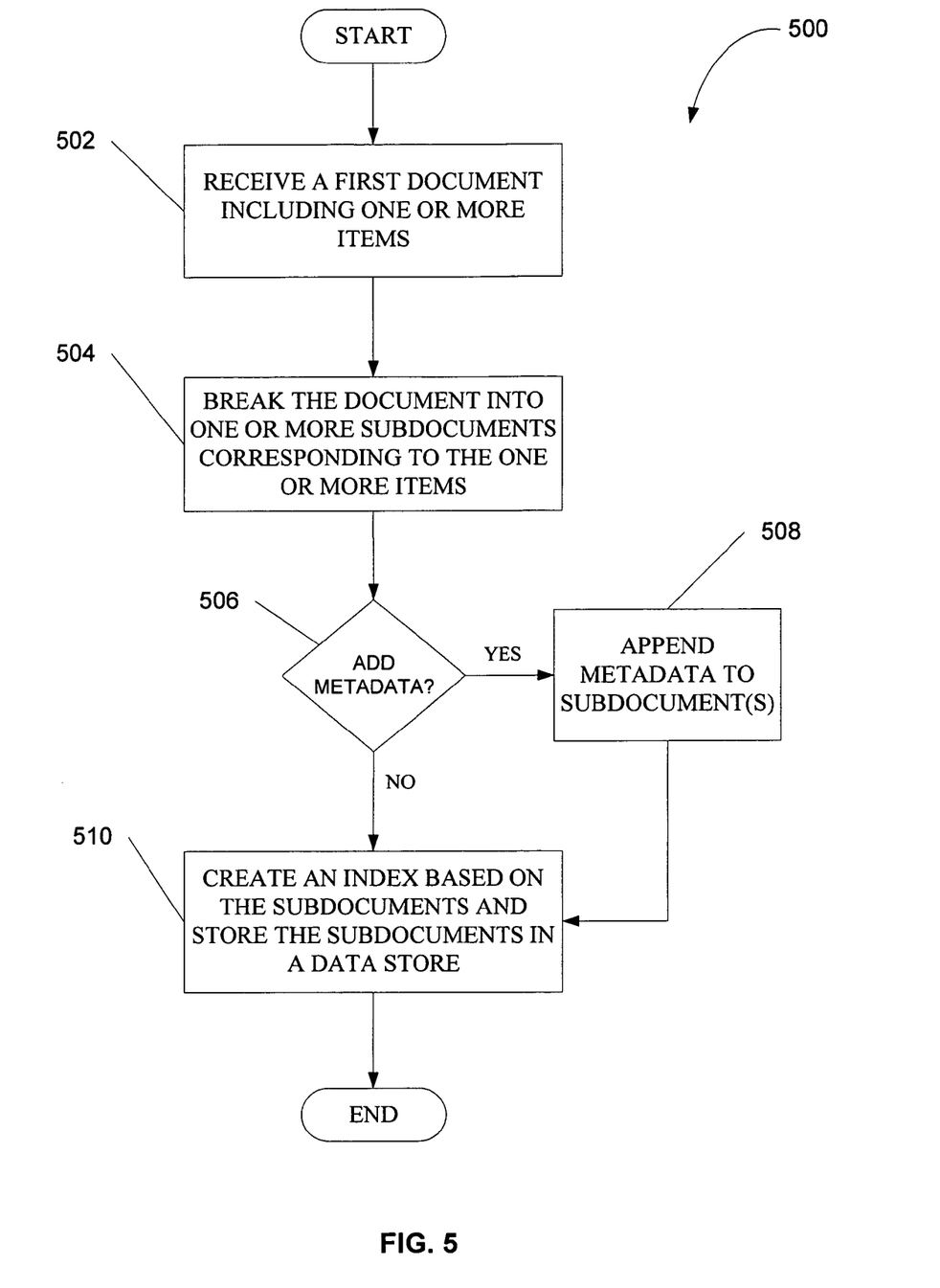
FIG. 5 illustrates a flowchart of an example embodiment for receiving and breaking document into subdocuments.

FIG. 5 illustrates a flowchart of an example embodiment for receiving and breaking document into subdocuments to be indexed and stored. At operation 502 a first document is received, the first document including one or more items. In one embodiment, the first document is retrieved via an application configured to search and retrieve documents from one or more document sources, such as via a web crawler retrieving documents from one or more domains as described above.

Next at operation 504, the received document is broken into two or more subdocuments based determining where each item begins and ends within the document. Each subdocument corresponds to each item extracted from the document. In various embodiments, one or more algorithms may be used to break each document into one or more subdocuments, as discussed above.

If at operation 506 a decision is made to supplement the one or more subdocuments with metadata. If yes, the metadata is appended in operation 508. As discussed in detail above, the metadata may be derived from one or all of specific data of the subdocument(s) item data, other data found within the original document or manually provided by a user.

At operation 510, each subdocument and amended metadata, if any, is indexed into an index data structure, such as the example embodiment of indexed data 318 in FIG. 3. The subdocuments may then be stored in a data store and later retrieved based on a search of the indexed data.

Figure 6:
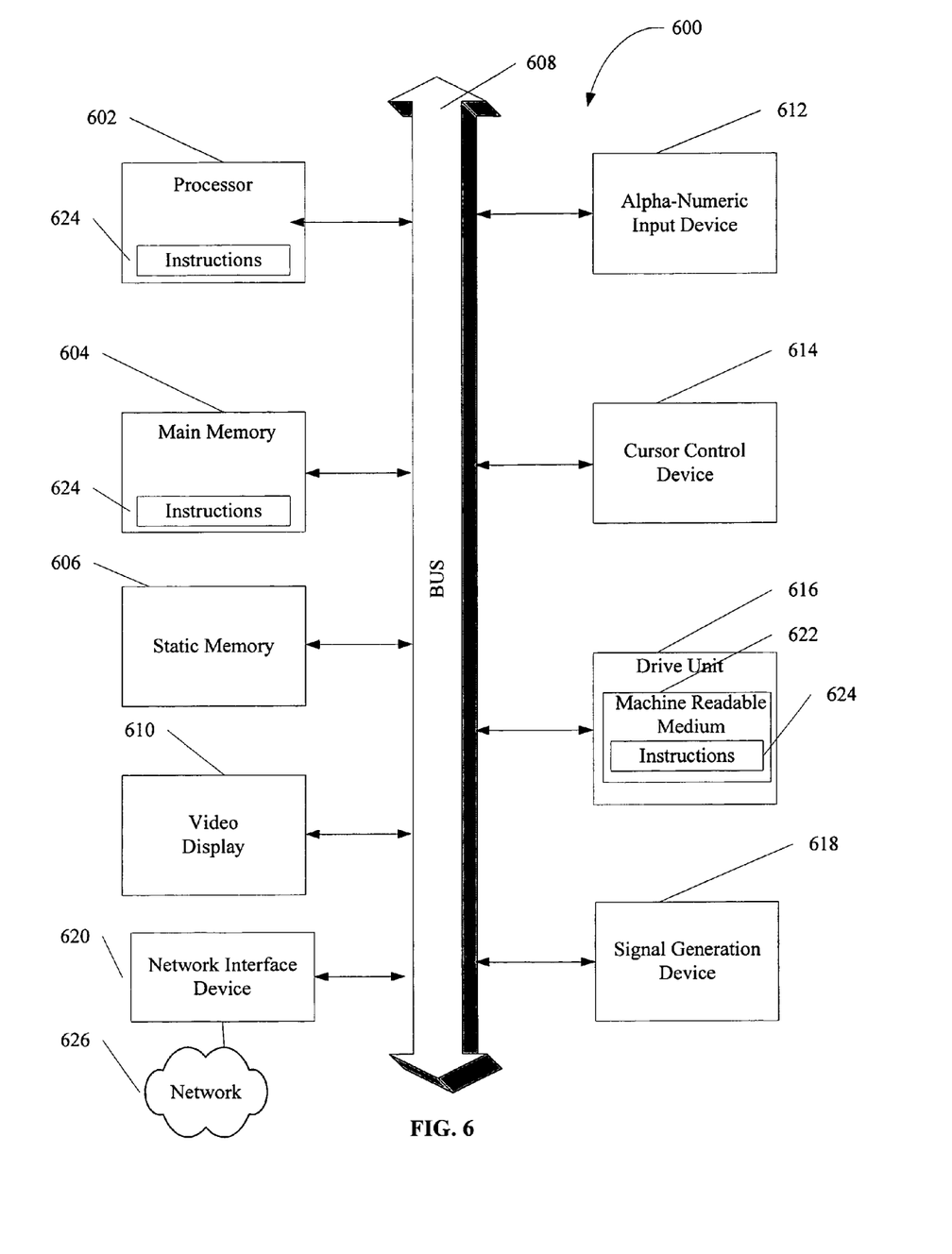
FIG. 6 shows a diagrammatic representation of machine in the example form of a computer system within which a set of instructions may be executed causing the machine to perform any one or more of the methodologies discussed herein.

FIG. 6 shows a diagrammatic representation of machine in the example form of a computer system 600 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 220 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform anyone or more of the methodologies of the present invention, or that is capable of storing data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:
   receiving a first document including a plurality of items that include item data associated with at least one of products, services, or events,
      the first document being a single page that is breakable into a plurality of subdocuments corresponding to the plurality of items;
   breaking the first document into the plurality of subdocuments corresponding to the plurality of items,
      the breaking of the first document being performed by a processor and including identifying one or more breaks,
      each break being associated with a boundary between at least two of the plurality of items,
      the identifying of the one or more breaks including rendering the first document and processing one or more image attributes;
   extracting document context data from the first document; and
   indexing each of the plurality of subdocuments into an index, the indexing including appending the document context data as metadata to at least one of the plurality of subdocuments.

2. The method of claim 1, wherein the receiving includes crawling a network and retrieving one or more documents including the first document.

3. The method of claim 1, wherein the identifying of the one or more breaks includes parsing data of the first document.

4. The method of claim 1, said method further comprising:
   receiving a query including search data from a user;
   matching the search data to index data stored in the index; and
   retrieving one or more subdocuments based on the subdocuments associated with the index data.

5. The method of claim 1, wherein:
   the document context data extracted from the first document includes a title of the first document; and the indexing includes appending the title to each of the plurality of subdocuments.

6. The method of claim 1, wherein:
the document context data extracted from the first document includes a manufacturer of at least one of the plurality of items included in the first document.

7. The method of claim 1, wherein:
the document context data extracted from the first document includes a provider of at least one of the plurality of items included in the first document.

8. The method of claim 1, wherein:
the document context data extracted from the first document includes a model of at least one of the plurality of items included in the first document.

9. The method of claim 1, wherein:
the document context data extracted from the first document includes a technical detail of at least one of the plurality of items included in the first document.

10. The method of claim 1, wherein:
the document context data extracted from the first document includes a rating of at least one of the plurality of items included in the first document.

11. The method of claim 1, wherein:
the document context data extracted from the first document includes a title of a review of at least one of the plurality of items included in the first document.

12. A computer system in communication with a network, the computer system comprising:
a processing module configured to receive a first document via the network,
the first document including a plurality of items that include item data associated with at least one of products, services, or events,
the first document being a single page that is breakable into a plurality of subdocuments corresponding to the plurality of items;
a processor configured by a break module embodied in a memory of the computer system, the break module configuring the processor to break the first document into the plurality of subdocuments corresponding to the plurality of items, the breaking of the first document including identifying one or more breaks, each break associated with a boundary between at least two of the plurality of items,
the identifying of the one or more breaks including rendering the first document and processing one or more image attributes; and
an index module configured to extract document context data from the first document and to index each of the plurality of subdocuments by appending the document context data as metadata to at least one of the plurality of subdocuments.

13. The computer system of claim 12, including a crawler module to crawl a network and return one or more documents including the first document.

14. The computer system of claim 12, wherein the break module to break the document includes the break module to identify one or more breaks by analyzing the first document structure to identify item data associated with each item of the plurality of items.

15. The computer system of claim 14, wherein the break module to analyze the first document structure to identify the item data includes the break module to apply text segmentation to the first document.

16. The computer system of claim 14, wherein the break module to identify the one or more breaks includes the break module to apply an HTML format analysis to the first document.

17. The computer system of claim 12, wherein the index module to index the plurality of subdocuments includes the index module to append document context data to at least one of the plurality of subdocuments.

18. The computer system of claim 12, including the index module to extract the document context data from one or more of the plurality of subdocuments and to append the document context data as metadata to each of the plurality of subdocuments.

19. The computer system of claim 12, said system further comprising:
a search module to receive a query including search data from a user; and
a list module match the search data to index data stored in the index and to retrieve one or more subdocuments based on the subdocuments associated with the index data.

20. A non-transitor machine-readable storage medium comprising a set of instructions that, when executed by one or more processors of a machine, cause the machine to perform operations comprising:
receiving a first document via a network,
the first document including a plurality of items that include item data associated with at least one of products, services, or events,
the first document being a single page that is breakable into a plurality of subdocuments corresponding to the plurality of items;
breaking the first document into the plurality of subdocuments corresponding to the plurality of items,
the breaking of the first document including identifying one or more breaks and being performed by the one or more processors of the machine,
each break associated with a boundary between at least two of the plurality of items,
the identifying of the one or more breaks including rendering the first document and processing one or more image attributes;
extracting document context data from the first document; and
indexing each of the plurality of subdocuments,
the indexing including appending the document context data as metadata to at least one of the plurality of subdocuments.

21. The machine-readable storage medium of claim 20, the instructions to further cause the machine to identify the one or more breaks by analyzing the first document structure to identify item data associated with each item of the plurality of items.

* * * * *

UNITED STATES PATENT AND TRADEMARK OFFICE
CERTIFICATE OF CORRECTION

| | | |
|---|---|---|
| PATENT NO. | : 8,131,752 B2 | Page 1 of 1 |
| APPLICATION NO. | : 11/599749 | |
| DATED | : March 6, 2012 | |
| INVENTOR(S) | : Ehud Nir et al. | |

It is certified that error appears in the above-identified patent and that said Letters Patent is hereby corrected as shown below:

In column 1, line 3, delete "TECHINICAL" and insert -- TECHNICAL --, therefor.

In column 12, line 26, in Claim 20, delete "non-transistor" and insert -- non-transitory --, therefor.

Signed and Sealed this
Nineteenth Day of June, 2012

David J. Kappos
*Director of the United States Patent and Trademark Office*